June 17, 1952

J. A. DEVILLE 2,600,858

CROSSROW CULTIVATOR

Filed Oct. 29, 1948

Inventor
Jacob A. Deville

By Munnn H Lane

ATTORNEY

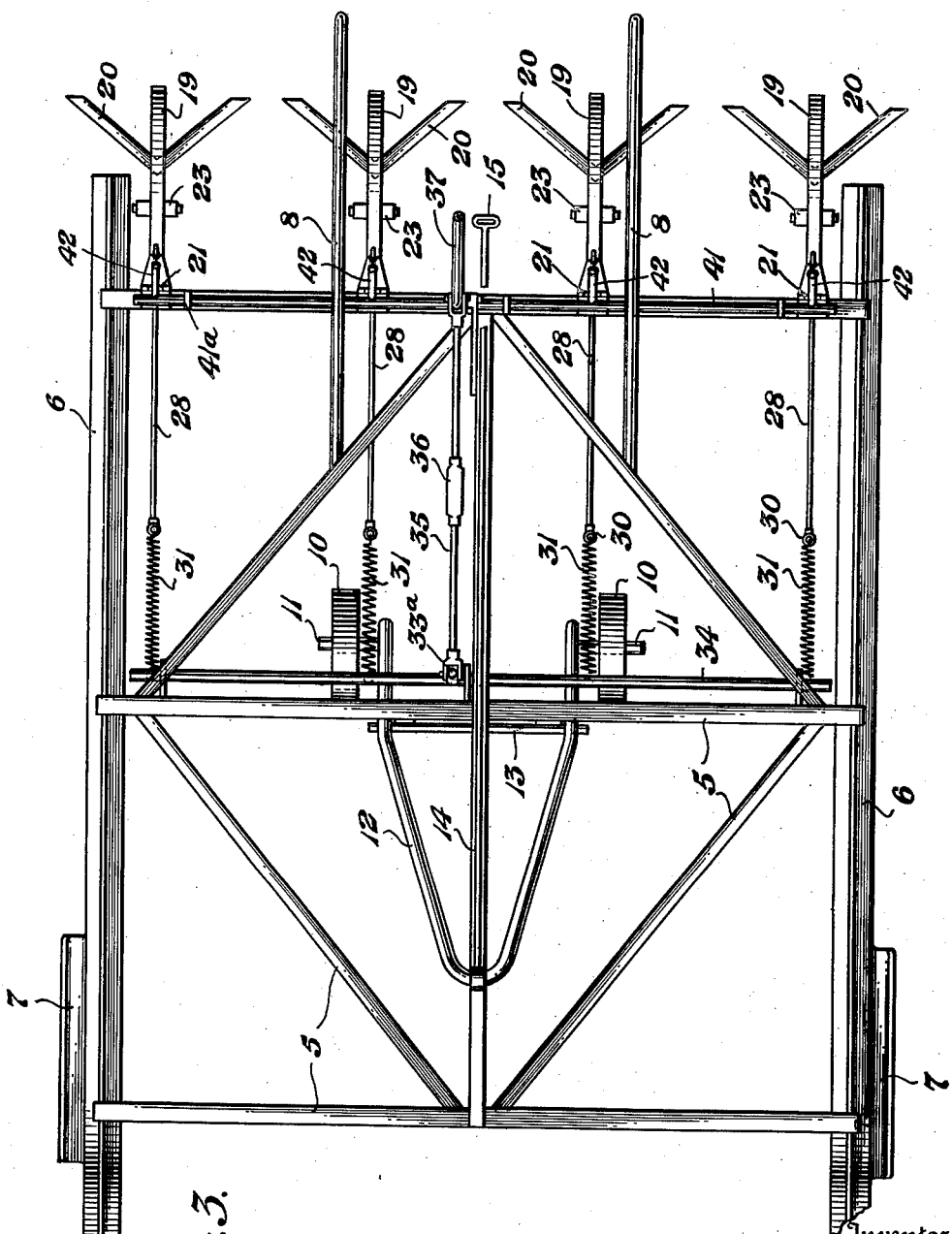

Patented June 17, 1952

2,600,858

UNITED STATES PATENT OFFICE 2,600,858

CROSSROW CULTIVATOR

Jacob A. Deville, Marksville, La.

Application October 29, 1948, Serial No. 57,265

17 Claims. (Cl. 97—23)

This invention relates to cultivators of the type which are drawn by draft animals or a tractor along or across rows of cultivated plants for the purpose of breaking up the hard crust on the soil and to uproot and kill weeds and grass, so that the young plants will grow faster and increase their ultimate yield.

One of the objects is to provide a "cross-row" cultivator especially useful for cultivating across the elevated rows or ridges employed everywhere in the South. Another object is to employ runners or skids on the cultivator, yet to make turning of the implement comparatively easy. A further object is to permit the operator, walking at the rear of the implement, to have easy access to all the cutters or blades, without necessarily stopping the cultivator. Another object is to provide a novel form of resilient mounting for the cutters or blades. A still further object is to provide novel resilient means to cause the cutters or blades to penetrate the soil, such resilient means permitting manual raising of the cutters or blades without resistance. Another object is to make possible adjustment of the depth of soil penetration, also adjustment of the resilient means effecting soil-penetration. Other objects and advantages will be obvious or will be pointed out as the description of a preferred embodiment of the invention proceeds.

In the accompanying drawings forming a part of this specification, and showing in more or less diagrammatic form a cultivator useful for attaining the stated and other objects of the invention—

Fig. 3 is a top plan view.

Figure 2:
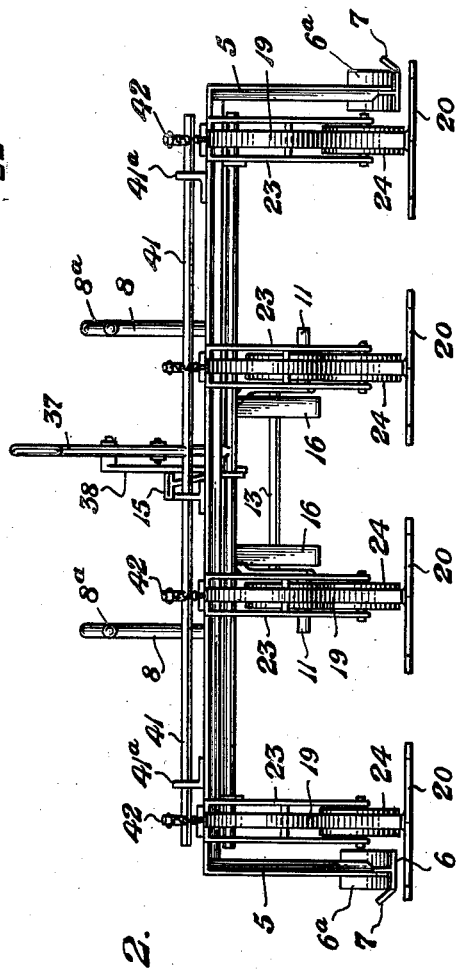
Fig. 2 is a rear end elevation.

Referring particularly to the drawings, the somewhat diagrammatic embodiment there shown includes an implement frame 5 mounted on a pair of runners or skids 6 which are parallel, with upwardly turned forward ends 6a. The implement frame 5 is shown greatly simplified, with nearly all braces and reinforcements omitted for clearness. The runners or skids 6 are preferably T-bars and are designed to slide over the surface of the ground. To give better performance during such sliding a longitudinal web or flange 7 is welded or otherwise secured to each skid adjacent its forward end and extends upwardly from the base of the T-bar at substantially 45°, as shown in Fig. 2. A pair of handles 8 are fixed to the top of the frame and have downturned ends 8a to facilitate grasping by the operator, who may lift the rear end of the machine and turn it at the ends of the rows, to permit starting on a new series of rows.

Figure 1:
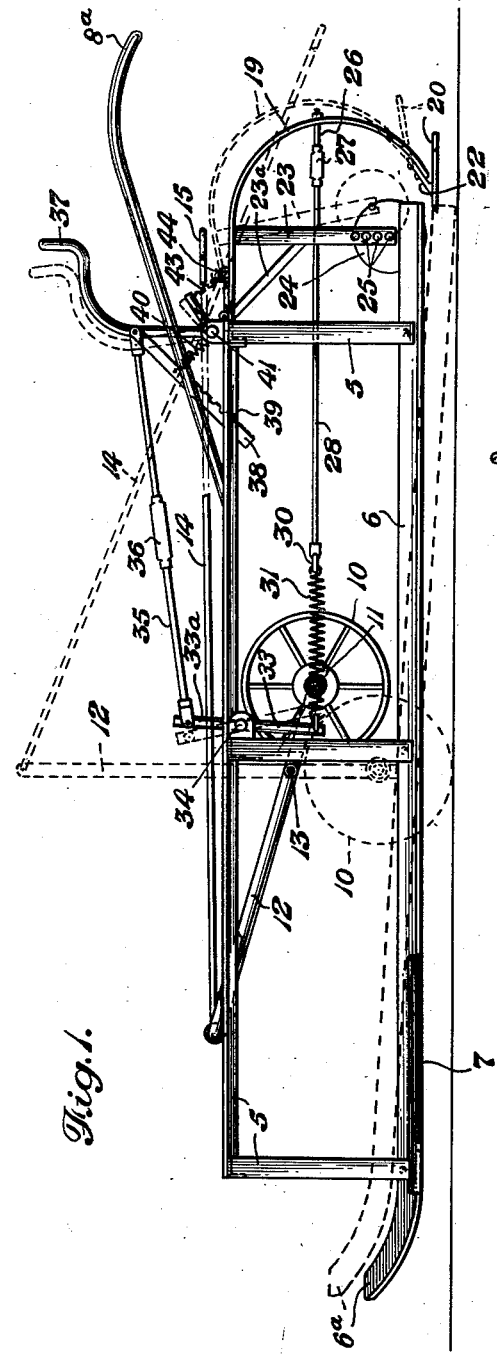
Fig. 1 is a side elevation, showing in dotted lines a lowered position of the turning wheels and the manner in which they lift the front end of the machine when so lowered, and also showing a hoeing unit in dotted lines in elevated position.

To make the turning operation much easier, a pair of relatively large ground wheels 10 are mounted on the machine. Preferably the wheels 10 rotate on stub axles 11 each fixed to one of the ends of a generally U-shaped swinging frame 12, pivoted on a transverse rod 13 fixed to a horizontal part of the frame 5. An operating or pull rod 14 is pivotally connected to the upper part of frame 12 and extends rearwardly over the top of the machine, and has a handle 15 by which it may be pulled or pushed, thereby to swing the U-frame to lower or raise the turning wheels 10. The pivot axis of the U-frame is somewhat forward of the medial transverse plane of the frame and the U-frame is of such length and is so pivoted that the turning wheels extend below the ground-engagement plane of the skids 6 when said U-frame has assumed a vertical position. See the dotted lines in Fig. 1. Suitable guides and stops may be fixed upon the frame to be engaged by the U-frame when in the extreme or vertical position, thereby to prevent sidewise movement of the turning wheels under the stresses imposed during turning. As is obvious from Fig. 1, the leverage provided by the U-frame is such that the operation of raising the turning wheels requires little exertion.

The preferred embodiment of the invention straddles three rows of plants and cultivates two other rows each along one side only. Hence the frame 5 is open from the front end to the rear, except for the turning wheels and cooperating parts, and is built sufficiently high to pass over the vegetation without injury to the plants. At its rear end the frame supports four hoeing elements each of which consists principally of a cutter or blade, a spring steel arm carrying the blade, and means for gauging the depth of cut of the blade. Associated with each such hoeing element is spring-tensioning means to cause the light weight blade to penetrate the soil even when dry and crusty or hard. Of course, there will be as many hoeing elements and associated mechanisms as are required by the machine: for example, if four rows are to be straddled, five hoeing elements will be employed.

Each hoeing element preferably consists of a spring steel arm 19, which may be identical with a spring harrow tooth except for certain connections and modifications hereinafter mentioned, which carries at its lower end a cutter or blade 20. The arm 19 is curved or bowed so as to subtend an angle of nearly 180°, and at its upper end is straight and extends horizontally forwardly to a pivotal or hinged connection 21 with a part of the frame 5. Thus the entire arm 19 lies to the rear of its pivot and is capable of swinging in a vertical plane about the axis of such pivot. Each blade or cutter 20 is flat and V-shaped, and has an attaching tongue 22 projecting upwardly by which it is bolted or otherwise removably but rigidly secured to the lower end of arm 19. The blades 20 when in active position lie in the same horizontal plane an inch or so below the ground-engaging plane of the runners or skids. Because of their resilient and pivotal mounting and connections, the blades will rise if obstructions are encountered, such as roots or boulders, but will immediately enter the soil again after the obstructions are passed. They act to break the hard top crust on the soil (if one is present) and to cut and uproot grass and weeds growing between the rows of cultivated plants. When dull, bent or worn, the blades are readily removed for resharpening, straightening or replacement.

To support the blades so that they will penetrate the soil to the desired depth, a vertical leg 23 is riveted or otherwise rigidly secured at its upper end to each spring steel arm 19. Preferably each leg 23 is composed of two spaced steel straps or bars, as is clear from Fig. 2, rigidly secured together, or a single bar bent into an elongated U may be employed. At its lower end each leg 23 straddles and supports a ground or gauging wheel or roller 24. A brace 23a further supports each leg 23. Perforations 25 at the lower end of leg 23 permit adjustment of the ground wheel 24 up and down on the leg 23. The higher up the wheel 24 is adjusted the deeper the cut or penetration of the blade. Thus the machine may be adapted for light, sandy soils as well as clayey loams.

As the machine is built as light as possible to facilitate handling by one man, to economize in manufacturing and to avoid deep penetration of the soil by the runners—thereby also saving the draft animals (if such are employed)—the cutters or blades will not enter the soil very far because of their own weight. To insure penetration of the soil to the depth determined by the gauging wheels, each spring steel arm 19 is coupled to spring tensioning means preferably consisting of a horizontal link 26 secured at its rear end to arm 19 at about the middle thereof, a turnbuckle 27 secured to the forward end of link 26 and in turn secured to another horizontal link 28, a hook 29 at the forward end of the link 28, a tension coil spring 31 with which the hook is engaged, and another hook 32 at the opposite end of spring 31 to couple the spring with the lower end of a vertically swinging lever arm 33 fixed to a rock shaft 34 extending crosswise of the frame 5. A lever 33a is fixed to rock shaft 34 and extends above the top of the frame and has a pivotal connection with a link 35 whose length is adjusted by a turnbuckle 36, said link 35 being pivotally connected to a hand lever 37 which is fast at its lower end to a rock shaft 41 supported in bearings 41a on the frame. Arms 42 are fixed on the rock shaft 41 (there being as many arms 42 as there are hoeing means) and short chain lengths 43 connect the free ends of the arms 42 with the upper parts of the spring arms 19, as indicated at 44. The hand lever 37 has a notched bar 38 pivoted thereto, the notches of said bar being engageable with a pin 39 secured to the frame, and a tension spring 40 being connected to the frame and notched bar to hold the latter engaged with pin 39.

The operation of the cultivator should be easily understood from the foregoing description. Initially the described machine is set so as to straddle three rows, with the runners or skids located midway between the two rows at either side of the machine. The depth of the cut or soil penetration having been determined by the adjustment of the gauging wheels 24, the operator grasps the handles and follows along behind the machine, which of course is hitched to draft animals or a tractor by means not shown. If the blades do not penetrate the soil properly, the tension of the springs 31 is increased by turning the turnbuckles 27, or if necessary the turnbuckle 36 may also be turned to swing the lower ends of levers 33 so as to increase the tension of springs 31. For very heavy soils heavier tension springs may be substituted; an easy operation since the tension springs are merely engaged by hooks or the like. When the ends of the rows are reached the operator raises the hoes and lowers the turning wheels to take the load off the runners or skids. This lifts the forward end of the machine upwardly, as indicated in dotted lines in Fig. 1, and the rear end is then lifted and moved about by the operator, the turn being made into the next three rows on either side. Then the turning wheels are raised, the blades are lowered, and the machine is pulled along the rows as before.

While the described cultivator is useful in ordinary "down-row" cultivation, it is considered to be even more useful in "cross-row" cultivation. In the South everything is cultivated on elevated rows. The skids will move smoothly crosswise of elevated rows, which is not true of wheeled cultivators. With my cultivator the plants are given the double benefit of cross-row cultivation as well as down-row cultivation. The up and down hinge motion of the hoes, and their independent mounting, assure an even depth of cut of all the cutter blades either on the level or across uneven rows. The adjustable link chains 43 keep the hoeing units suspended while crossing from the top of one row to the top of the next row.

Furthermore, all the hoeing units are attached to a single part of the frame. Thus the cutters do not plow up the young plants in case the machine side slips, as would happen were the cutters arranged in several rows or in a V. The operator can observe all the cutters at all times and if one becomes fouled with grass or weeds it is easily reached by hand for cleaning.

The described construction is especially valuable for hoeing and cultivating young corn and cotton plants and other seedling plants growing in loose top soil. In such soil any slow dragging cutting tool does not satisfactorily uproot grass, weeds or vines. A quick arcuate springing action moving the tool in an arc in a manner similar to a hand-wielded hoe is necessary, and is attained in my construction. As the cultivator is pulled across the ridges (in cross-row cultivation) when a cutter enters the open space between two ridges the coil spring 31 closes. When the cutter enters the next ridge the resistance it meets causes the spring to elongate, and when the resultant tension is sufficient to overcome the resistance of the cutter the spring 31 recoils quickly, jerking the cutter arcuately across the top of the ridge. This action takes place at every ridge and with each cutter.

Other advantages of the construction are the easy turning (once the turning wheels are lowered) and the fact that the spring tension on the hoeing units is not increased when the hoeing units are elevated by the operator. Further advantages will be obvious to those skilled in the art.

It will be quite clear that many changes may be made in the described construction, which is shown as partly diagrammatic, without departing from the scope of the invention, which is defined in the appended claims.

What is claimed is:

1. A cultivator comprising a frame, means to support the frame at an elevated position so that it may travel above the ground, a single transversely disposed row of hoeing means supported at the rear of the frame only, each hoeing means comprising a curved cutter supporting arm, said arm being generally semicircular and having a pivot connection at its upper end with the frame, a horizontally disposed flat hoe blade or cutter rigidly secured to the lower end of each supporting arm and normally disposed below the level of the frame supporting means, and means moved by the operator, including a transverse rock shaft mounted on the frame in advance of the pivot connections of said hoe carrying arms, levers rigid therewith and extending downwardly therefrom, a series of spring tensioned horizontally extending links each connected at one end to one of said levers and at the other end to one of the curved supporting arms intermediate the blade and the pivot point, to simultaneously swing the supporting arms and their cutters about said pivot connections.

2. A cultivator comprising a frame, means to support the frame so that it may travel over the ground, a single transverse row of hoeing means each pivotally supported substantially at the rear only of the frame, a plurality of individually adjustable springs connected to the frame in advance of the hoeing means, and horizontal links connecting said springs and said hoeing means, a ground-engaging wheel rotatably supported on and directly in advance of each hoeing means, and operator-controlled means, including a transverse rock shaft mounted on said frame in advance of the pivot points of said hoeing means having downwardly extending levers rigid with the shaft and connected to said springs, to simultaneously swing the several hoeing means about their pivots, together with the ground-engaging wheels, said spring devices and links being moved simultaneously in the same direction so that the tension on the hoeing means is not increased.

3. A cultivator comprising a frame, means to support the frame in an elevated position so that it may travel over the ground, a single transverse row of hoeing means each pivotally supported at the rear of the frame only, a plurality of vertical legs each rigidly secured at its upper end to the upper portion of one of said hoeing means, a ground wheel fixed to the lower end of each vertical leg, each ground wheel being in advance of and above the lowest part of the hoeing means, means permitting adjustment of each ground wheel on the vertical leg, a transverse rock shaft carried by the frame intermediate its ends, levers carried by said rock shaft to swing in vertical planes extending longitudinally of the cultivator, horizontally disposed coupling means including a tension coil spring and an adjustable link, for connecting one end of each lever with one of said hoeing means, and a mechanism controlled by the operator to move all said levers simultaneously thereby to simultaneously swing said hoeing means and the ground-engaging wheels carried thereby.

4. A cultivator comprising a frame, means to support the frame so that it may travel in an elevated position above the ground, a single transverse row of hoeing means supported at the rear of the frame only, each hoeing means comprising a generally semicircular arm pivoted at its upper end, a plurality of horizontally disposed flat V-shaped blades or cutters each rigidly secured to the lower end of one such arm, the cutters being spaced from each other and lying in the same horizontal plane, a transverse rock shaft carried by the frame intermediate its ends, levers projecting from said rock shaft, a horizontally acting tension coil spring connected to one end of each lever, horizontally disposed link means coupling the other end of each coil spring with the semicircular arms at points intermediate the ends thereof, individual tension adjusting means carried by said links, and operator-controlled means connected to said rock shaft to swing said levers and effect a swinging movement of the cutters.

5. A cultivator comprising, in combination, an elevated frame open end to end to permit passage over growing plants without injury, a single transverse row of hoeing means supported at the rear only of the frame, each hoeing means being hinged at its upper end, a transverse rock shaft carried by the frame intermediate the ends of the frame, levers rigid with said rock shaft, horizontally disposed means connecting said levers and said hoeing means, each including a spring, a link, and tension adjusting means, and operator-actuated mechanism connected to said rock shaft for swinging said hoeing means simultaneously about their hinges.

6. A cultivator comprising an elevated frame, a single transverse row of individual hoeing means including semicircular hoe supporting arms hingedly connected at their upper ends at the rear of the frame, and individual horizontally disposed coil springs having connecting links secured to the supporting arms of the individual hoeing means permitting swinging movement of said individual hoeing means, a transverse rock shaft carried by said frame in advance of the hinge points of said hoe supporting arms, and levers carried by said rock shaft and connected to said individual springs.

7. A cultivator comprising an elevated frame, a single transverse row of individual hoeing means each including a semicircular hoe supporting arm hingedly connected at its upper end to the rear of the frame, horizontally disposed coil springs having connecting links secured to the supporting arms of the individual hoeing means, a transverse rock shaft carried by said frame in advance of the hinge points of said hoe supporting arms, levers rigid with said rock shaft and connected to said individual springs, and means for individually adjusting the position of each hoeing means.

8. A cultivator comprising an elevated frame, a single transverse row of individual hoeing means each including a semicircular supporting arm hingedly connected at its upper end to the rear of the frame, individual horizontally disposed coil springs having connecting links secured to the supporting arms of the individual hoeing means permitting swinging movement of said individual hoeing means, a transverse rock shaft carried by said frame in advance of the hinge points of said hoe supporting arms, levers rigid with said rock shaft and connected to said individual springs, means for adjusting said individual tensioning means, and means for actuating said rock shaft for simultaneously moving all the hoeing means.

9. A cultivator including an elevated frame, a single transverse row of hinged semicircular hoe supporting arms connected at their upper ends to the rear of the frame only, a transverse rock shaft located above the hinge connections and having a plurality of levers projecting therefrom, individually adjustable chains connecting the ends of the levers with the individual hoe supporting arms in rear of their hinge connections, a transverse second rock shaft carried by said frame in advance of the hinge connections of said hoe supporting arms, downwardly extending levers rigid therewith, horizontally disposed springs each connected at one end to one of said downwardly disposed levers and at the other end to one of said hoe supporting arms intermediate its ends, and means for simultaneously actuating said rock shafts to swing said hoe supporting arms about their hinge connections.

10. A cultivator comprising an elevated frame, a single transverse row of semicircular hoe carrying arms pivotally connected at the rear of the frame, a transverse rock shaft carried by the frame intermediate the ends of the frame, a series of downwardly projecting levers carried by said rock shaft, a corresponding series of horizontally disposed means resiliently connecting said levers with said arcuate arms intermediate their ends, and means for actuating said rock shaft.

11. A cultivator comprising an elevated frame, ground-engaging members normally supporting said frame above the ground level, a single row of cultivator elements in transverse alignment carried at the rear only of said frame, each said element comprising a semicircular hoe supporting arm hingedly attached at its upper end to said frame and a horizontally disposed blade portion carried by said arm normally extending in a horizontal plane below the level of the ground-engaging supporting members, a transverse rock shaft carried by said frame in advance of the hinge connections of said hoe supporting arms, downwardly extending levers rigid with said shaft, horizontally disposed spring devices connecting each of said levers with a corresponding hoe supporting arm intermediate its ends, and means for actuating said rock shaft.

12. A cultivator as set forth in claim 11 wherein individually adjustable tensioning means are provided for said springs.

13. A cultivator as set forth in claim 12 wherein the position of each cultivator element is individually adjustable with reference to the others.

14. A cultivator as set forth in claim 11 wherein the supporting members are skids.

15. A cultivator as set forth in claim 11 wherein individually adjustable tensioning means are provided for said springs for insuring ground penetration of the cultivator elements, said means including a horizontal arm attached to each of said arcuate cultivator arms intermediate its ends, and a turnbuckle associated therewith.

16. A cultivator as set forth in claim 11 wherein each cultivator element is provided with a depth gauge.

17. A cultivator as set forth in claim 11 wherein each cultivator element is provided with a depth gauge, each depth gauge comprising a vertical leg secured at its upper end to its respective cultivator element adjacent the edge thereof, and having a gauge roller at the lower portion thereof.

JACOB A. DEVILLE.

REFERENCES CITED

The following references are of record in the file of this patent:

UNITED STATES PATENTS

| Number | Name | Date |
|---|---|---|
| 340,242 | Reeves | Apr. 20, 1886 |
| 340,360 | Reuss | Apr. 20, 1886 |
| 410,769 | Rowell | Sept. 10, 1889 |
| 442,031 | Flanagan | Dec. 2, 1890 |
| 802,317 | Randall | Oct. 17, 1905 |
| 882,751 | Edwards | Mar. 24, 1908 |
| 897,057 | Brooks | Aug. 25, 1908 |
| 932,785 | King | Aug. 31, 1909 |
| 950,966 | Snow | Mar. 1, 1910 |
| 955,756 | Burch | Apr. 19, 1910 |
| 1,341,365 | Fogh | May 25, 1920 |
| 1,369,469 | Reed et al. | Feb. 22, 1921 |
| 1,561,466 | Healy | Nov. 17, 1925 |
| 1,621,993 | Mills | Mar. 22, 1927 |
| 1,685,318 | Elder | Sept. 25, 1928 |
| 2,239,918 | Kriegbaum | Apr. 29, 1941 |
| 2,359,206 | Currie | Sept. 26, 1944 |

FOREIGN PATENTS

| Number | Country | Date |
|---|---|---|
| 12,680 of 1933 | Australia | Apr. 4, 1934 |
| 114,331 | Australia | Dec. 2, 1941 |